Jan. 6, 1970    W. M. MAY ET AL    3,487,634
CONSTANT HORSEPOWER INTERNAL COMBUSTION ENGINES
Filed March 19, 1968    7 Sheets-Sheet 1

INVENTORS:
WALTER M. MAY
WINTON J. PELIZZONI
BY
Brumbaugh, Free, Graves & Donohue
THEIR ATTORNEYS Jan. 6, 1970 W. M. MAY ET AL 3,487,634
CONSTANT HORSEPOWER INTERNAL COMBUSTION ENGINES
Filed March 19, 1968 7 Sheets-Sheet 2

INVENTORS:
WALTER M. MAY
WINTON J. PELIZZONI
BY
Brumbaugh, Free, Graves & Donohue
THEIR ATTORNEYS FIG.IOA.
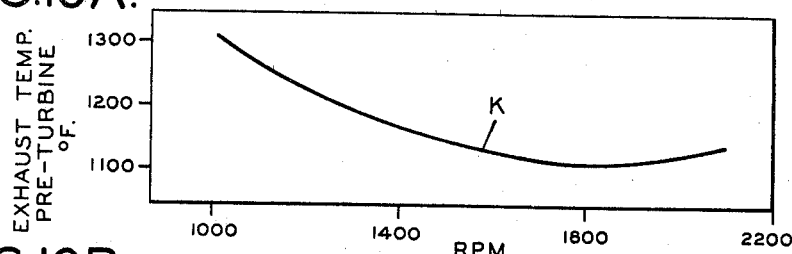
FIG.IOB.
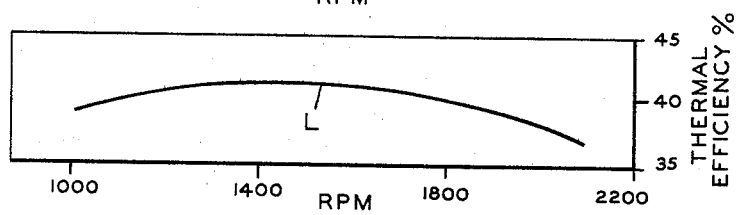
FIG.IOC.
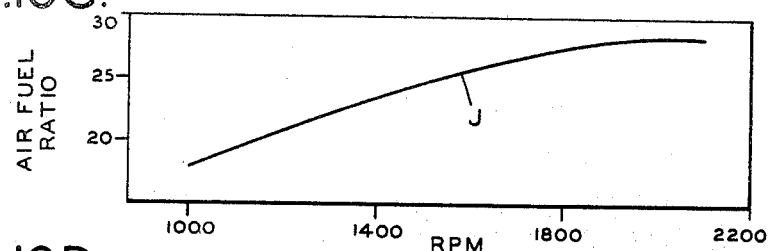
FIG.IOD.
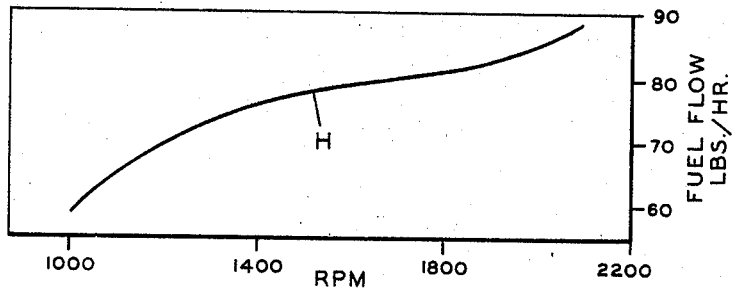
FIG.IOE.
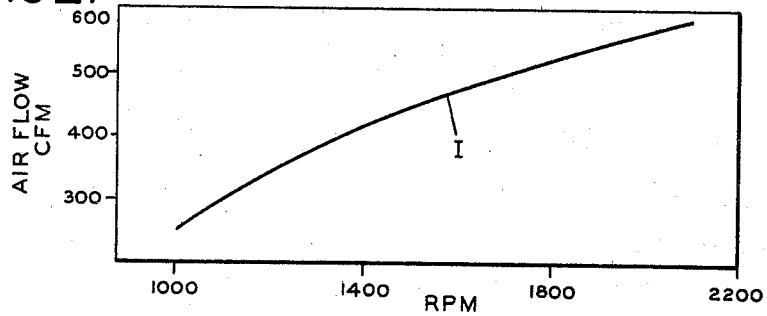
INVENTORS:
WALTER M. MAY
WINTON J. PELIZZONI
BY
THEIR ATTORNEYS United States Patent Office 3,487,634
Patented Jan. 6, 1970

3,487,634
CONSTANT HORSEPOWER INTERNAL COMBUSTION ENGINES
Walter M. May, Allentown, Pa., and Winton J. Pelizzoni, Hagerstown, Md., assignors to Mack Trucks, Inc., Allentown, Pa., a corporation of New York
Filed Mar. 19, 1968, Ser. No. 714,285
Int. Cl. F02b *37/00;* F01p *3/08*
U.S. Cl. 60—13                                4 Claims

ABSTRACT OF THE DISCLOSURE

An internal combustion engine of the compression ignition type having a turbocharger and fuel control system such that when matched with a transmission having a relatively small number of speed-change ratios therein provides enhanced vehicle performance through the generation of a substantially constant horsepower output of the engine throughout the normal operating range of the engine, the turbocharger being related to the fuel system to produce a scavenging negative pressure in the range of maximum governed operating speeds of the engine, thereby providing a more suitable air-fuel ratio in the higher speed ranges and preventing overspeeding of the turbocharger.

---

This invention relates to improvements in compression ignition engines, and particularly to improvements in engines capable of developing a substantially constant horsepower output through the operating range of engine speeds.

Diesel engines for commercial vehicle application have been and continue to be developed for improved smoke-limited output without sacrifice in operating economies. In order to improve the operation of vehicles with such engines, development initially was in the direction of increased piston displacement, higher operating speeds and the like. By adding superchargers or turbochargers to such engines it was possible to increase very appreciably the horsepower output of an engine without increasing its piston displacement. However, increases in the horsepower of an engine for a commercial vehicle which operates under heavy loads do not solve the problem of efficiently utilizing the horsepower for the propulsion of the vehicle. This can only be accompilshed through the medium of a multi-speed transmission and even then only if a great many speed ratios are provided in the transmission.

Recognizing that the complexity of the transmission can be reduced if the horsepower output of the engine can be maintained constant, efforts were made to produce such constant horsepower output by reducing the amount of fuel supplied to the cylinders in the approximate upper half of the operating speed range of the engine. This rendered the horsepower output of the engine more uniform but also reduced the maximum horsepower output of the engine so that little was gained by such a development. More recently, an engine was developed for railroad type diesel engines in which a turbocharger or supercharger was used together with a controlled fuel feed to the engine cylinders whereby the power output at the lower end of the operating speed range is increased while the maximum power output of the engine at the top of the engine operating r.p.m. range also is maintained above that of a naturally aspirated engine of the same characteristics. This engine is described in a paper entitled "The Paxman 'Hi-Dyne' Engine for Diesel Traction" by D. M. Pierce—presented to the International Combustion Engine Congress at the Hague on May 24, 1955. While substantially improved performance was achieved with the Paxman engine, it did not satisfy requirements for automotive vehicles and the like for the reason that the turbochargers then available were not capable of supplying air to the engine efficiently in the lower operating speed range of the engine without danger of overspeeding in the high operating speed range of the engine, and particularly at high altitude.

Engines which make use of improved turbocharger constructions are described more particularly in our U.S. Patent No. 3,289,661 dated Dec. 6, 1966. The engine described in this patent is a great step forward in the development of constant horsepower engines because of the availability of improved turbochargers and fuel control techniques enabling the engine to be used with a five or six speed transmission even for a propelling vehicle having a gross vehicle load or weight of many tons, thereby greatly easing the task of the driver and achieving substantial operating economies.

The present invention is an improvement over the engines disclosed in the Pierce article and our prior patent in that it enables better matching of the turbocharger to the fuel control system and engine and with an improved control over the operation of the turbocharger so that it will not overspeed in the high operating r.p.m. range of the engine or under high altitude conditions, and also provides better control of the engine output so that a transmission matched to the engine greatly facilitates the operation of a vehicle utilizing such an engine and transmission.

More particularly, in accordance with the present invention, the new engine is provided with a turbocharger having an exhaust gas driven turbine section of the divided volute type to which gas is delivered by a divided manifold system, and further providing a governor control system for the fuel injection pump which essentially provides a constant or slightly increasing horsepower output, as the purpose demands, from the low end of the operating r.p.m. range to the upper end of the operating range of the engine and which provides a better control over the cylinder pressures and the scavenging pressures in the system and better utilization of the fuel supply in the system.

For a better understanding of the present invention, reference may be had to the accompanying drawings, in which:

FIGURES 10A, 10B, 10C, 10D and 10E are charts illustrating other performance characteristics of the engine;

For purposes of illustration, a six cylinder diesel or compression ignition engine 10 is schematically illustrated, this engine by way of example having a 4⅞ inch bore by 6 inch stroke and having a 672 cubic inch piston displacement. The normal operating range of this engine for propelling a vehicle is between 1200 and 2100 r.p.m. with an idling speed of 600 r.p.m. or lower. The fuel injection system 11 for the engine is of conventional type purchased on open market and includes a pump, such as, for example, the APE 6 BB fuel injection pump, manufactured by American Bosch Arma Corporation, which is provided with a fuel pump governor generally of the type manufactured by American Bosch Arma Corporation and identified as the GVB/C governor conventionally supplied with the pump. The fuel injection system and governor are illustrated in greater detail in our Patent No. 3,289,661.

Figure 5:
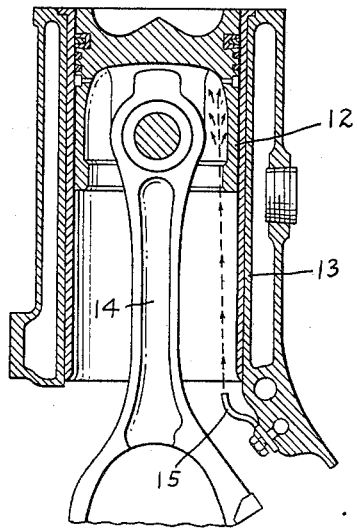
FIGURE 5 is a view in section through one of the cylinders and a piston of the engine.

For reasons which will be explained hereinafter and as disclosed in FIGURE 5 of the drawings, the pistons 12 of the engine moving in the cylinders 13 and connected in the usual way by means of a connecting rod 14 to the crankshaft of the engine (not shown), are provided with a piston cooling system including a jet 15 mounted on the engine block for directing oil against the under surface of the piston to cool it. Any conventional type of oil pump may be used for supplying the oil to the jets from the crankcase of the engine.

Figure 1:
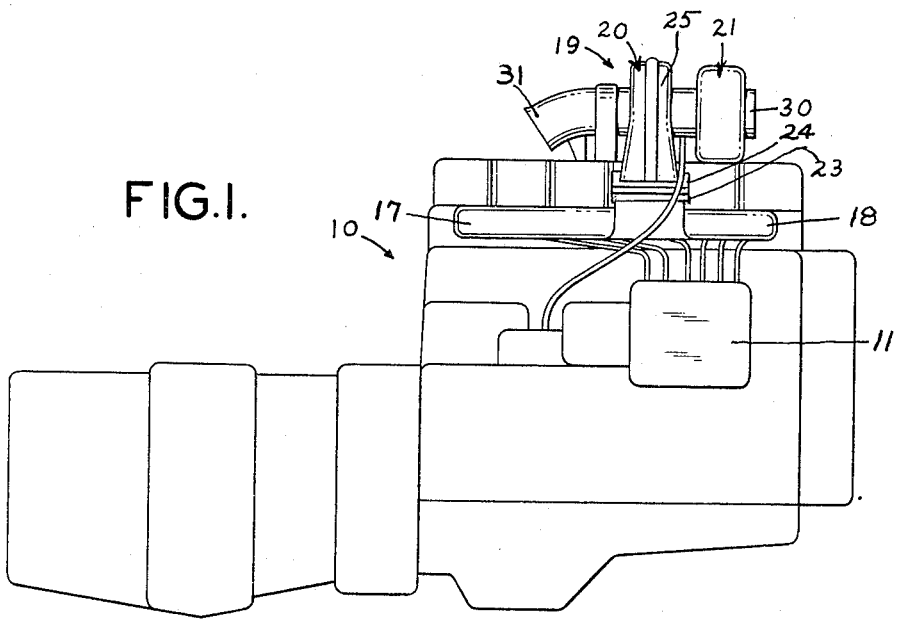
FIGURE 1 is a schematic side elevational view of a typical engine embodying the present invention.
Figure 2:
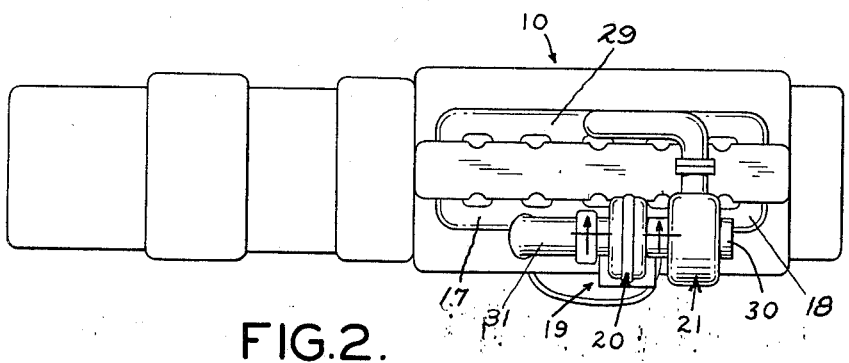
FIGURE 2 is a top plan view thereof.
Figure 3:
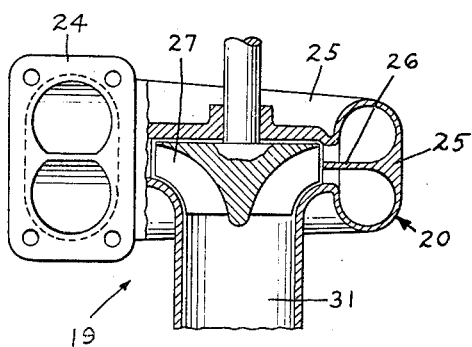
FIGURE 3 is a cross-sectional view of the turbine of the turbocharger.

A most important feature of the engine is the form of turbocharger used for supplying combustion supporting air to the cylinders of the engine. Referring to FIGURE 2 of the drawings, separate exhaust manifolds 17 and 18 are provided, one manifold receiving exhaust gases from the front three cylinders of the engine and the other receiving exhaust gases from the rear three cylinders of the engine and supplying them to a turbocharger 19 which includes a turbine 20 and a blower 21. The ends of the manifolds may be connected to a flange 23 which is bolted or otherwise engaged to an end flange 24 on the volute casing 25 of the turbine 20. As best seen in FIG. 3, the volute is provided with a center, radially extending partition plate 26 which terminates at its inner edge closely adjacent to the rotor 27 of the turbine 20 so that the exhaust gas pulses from the cylinders are kept separate almost up to the time that the gases enter the pockets between the vanes on the turbine rotor 27. Turbines of the type described are available from AiResearch Corporation and the Schwitzer Corporation and are disclosed, for example, in the Cazier Patent No. 3,292,364 dated Dec. 20, 1966, and the Connor Patent No. 3,270,495 dated Sept. 6, 1966. Such turbochargers are much more efficient than prior turbochargers at low gas velocities and volumes and consequently are well suited to supplying air to the intake manifold 29 of the engine 10 by means of the blower 21 which may be of the conventional radial flow, vane or vaneless type.

Figure 6:
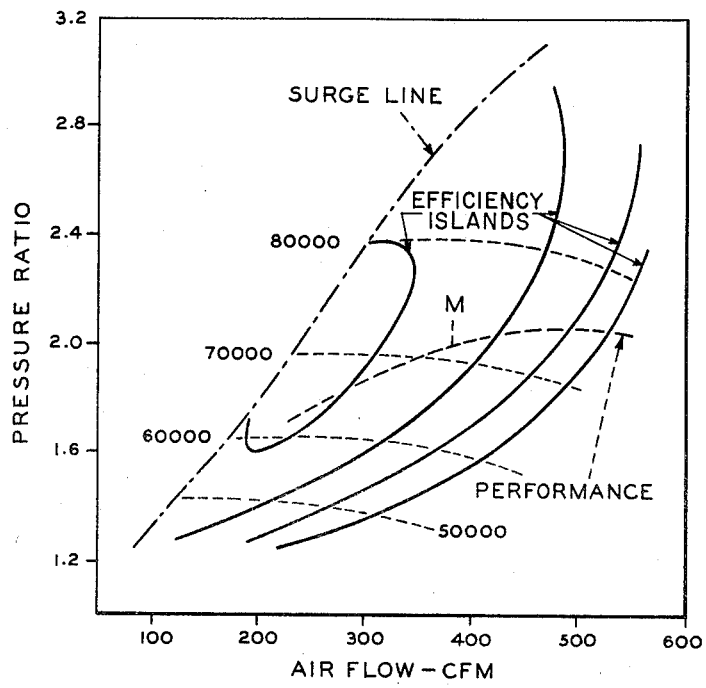
FIGURE 6 is a chart illustrating the performance curve of a typical engine as related to the turbocharger speeds in accordance with the present invention.

Turbochargers of the type described as applied to the new engine have performance characteristics illustrated in FIGURE 6 of the drawings. The curve M shows the lowest engine speeds lie well within the maximum compressor efficiency island of 70%. At higher engine speeds the efficiency decreases to a minimum of approximately 60% at 2100 r.p.m. Also, as indicated by the performance curve M, the maximum turbine speed is 75,000 r.p.m. which allows more than a required safety factor for altitude compensation. The lower efficiency in the higher speed ranges would appear to be detrimental to engine performance but actually is of little consequence since as explained hereinafter the air-fuel ratio is so high and thermal efficiency is so good.

The turbocharger 19 may be conveniently mounted above the cylinder head of the engine with the intake 30 of the compressor directed suitably for connection with an air cleaner or the like. The exhaust port 31 of the turbine is connected to the usual exhaust system for the engine.

Figure 4:
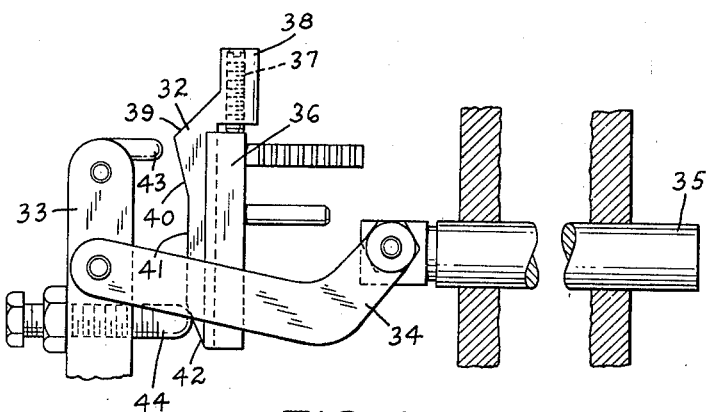
FIGURE 4 is a fragmentary side elevational view of the fuel control cam and fulcrum lever for regulating the supply of fuel to the engine.

The fuel control governor system for the fuel injection pump differs from that conventionally supplied with the fuel pump and also from that disclosed in our prior Patent No. 3,289,661 in the arrangement of the maximum fuel flow cam plate 32 (FIGURE 4) and the fulcrum lever 33. As illustrated in FIGURE 4, the fulcrum lever 33 is connected by means of a pivoted link 34 to the rack 35 which controls the amount of fuel injected for each combustion stroke. The zero position of the rack 35 occurs at 2100 r.p.m. full load. The cam plate 32 is mounted for vertical adjustment in a slide or guide 36 and can be adjusted by means of a screw 37 received in a flange 38 on the cam plate and engageable with the upper end of the guide 36 or threaded into it.

Figure 11:
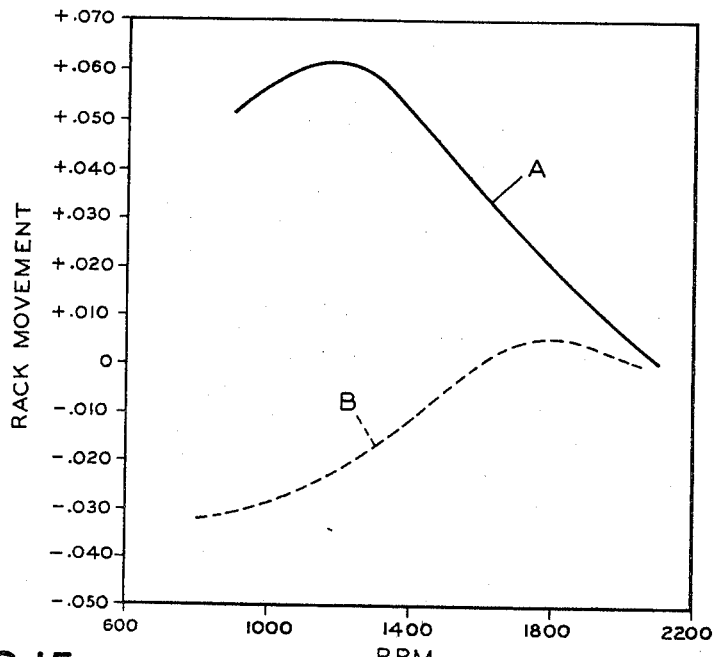
FIGURE 11 is a chart showing the movement of the fuel control rack of the new engine as compared with the movement of the fuel control rack of a conventionally turbocharged engine.

The cam 32 includes a downwardly and leftwardly inclined surface 39 merging into a downwardly and rightwardly inclined surface 40, a vertical surface 41 and a downwardly and rightwardly inclined surface 42, from top to bottom. A fulcrum lever is provided with a cam nose 43 for cooperation with the cam surfaces 39 and 40 and a droop screw 44 which, under certain conditions, cooperates with the cam surface 42. At the maximum limit determined by governed speed, the cam nose 43 is tight against the cam plate 32 from about 2100 r.p.m. down to approximately 1200 r.p.m., so that as the engine speed decreases, the amount of fuel supplied to the engine increases. At about 1200 r.p.m., the droop screw 44 engages the surface 42 due to the action of the governor fulcrum lever tending to move the cam nose away from the plate and into the "off" or idling position of the rack, as shown in FIGURE 4. Between 2100 and 1400 r.p.m., the cam nose 43 engages the cam slope 40 and rides on to the peak between the cam surfaces 39 and 40 at 1400 and down the slope 39 until 1200 r.p.m. is reached so that the rack moves in a direction to increase the fuel supply until the droop screw 44 takes over by engagement with the cam surface 42. In this way, an effective control of the fuel for the various operating ranges is achieved. For a better visualization of the action of the cam, reference may be had to FIGURE 11 in which the curve A illustrates the fuel supply rack movement between 2100 and 900 r.p.m. in accordance with the present invention. The curve B illustrates the conventional rack movement with a conventionally turbocharged engine in which the fuel supply is increased as the engine speed increases between about 800 and 2100 r.p.m. It will be clear, therefore, that with the present governor control, the amount of fuel is progressively increased as the engine speed decreases and then decreases below the peak torque speed of 1200 r.p.m.

Figure 7:
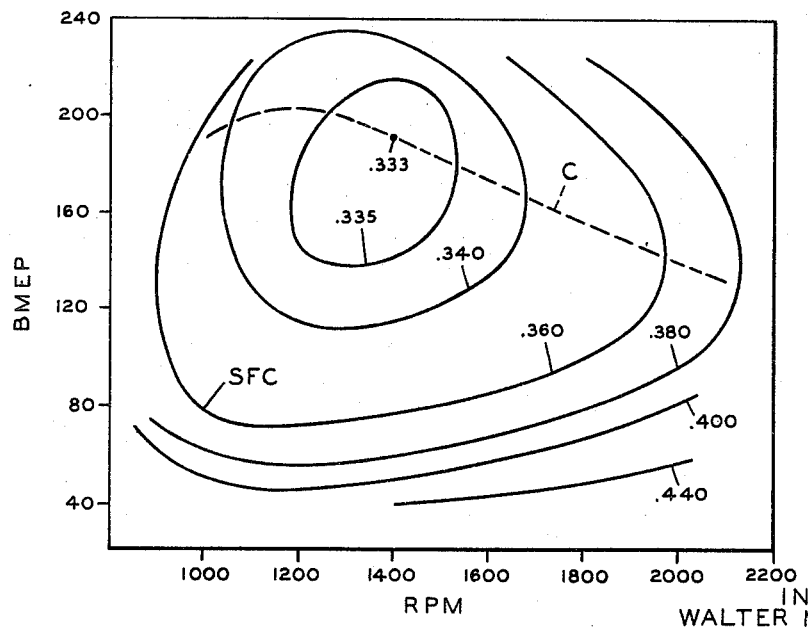
FIGURE 7 is a chart illustrating the specific fuel consumption conditions under all speeds and loads of an engine in accordance with the present invention.

The specific fuel consumption with the new engine is illustrated by the curve C, FIGURE 7, which shows that, at full throttle, economy varies from approximately .350 lbs./b.h.p./hr. at 1000 r.p.m. to a minimum of .333 at 1400 r.p.m., and then increases to a maximum of about 379 at 2100 r.p.m. The specific fuel consumption islands are large, thereby showing that the engine is very economical even under considerably reduced loads. The almost ideal full throttle conditions as related to the specific fuel consumption attest to the good match between the urbocharger and the fuel injection system as related to combustion efficiency.

Figure 8:
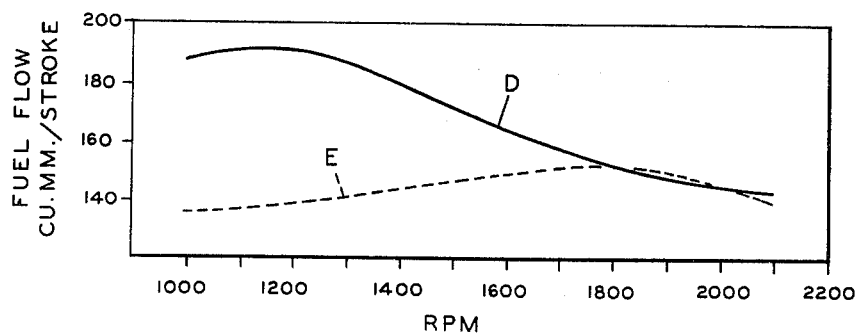
FIGURE 8 is a chart illustrating the fuel delivery of the new engine as compared with the fuel delivery of a conventionally turbocharged engine.

A further indication of the fuel and air flow is illustrated by the curve D in FIGURE 8, wherein the fuel delivery in cubic millimeters per stroke is a maximum of approximately 190 at 1100 to 1200 r.p.m. and slowly decreases with increasing speed to a minimum of 145 to 2100 r.p.m.

Curve E illustrates the fuel flow in cubic millimeters per stroke with a conventionally turbocharged engine in which the fuel flow is at a maximum of approximately 152 cubic millimeters per stroke at 1800 r.p.m. and minimums of slightly under 140 cubic millimeters at both 1000 and 2100 r.p.m. Accordingly, while the flow for both engines is essentially the same at the higher speeds, the difference is very marked at the lower speeds with the new engine showing approximately one-third more fuel flow in the range of 1000 to 1300 r.p.m.

Figure 9:
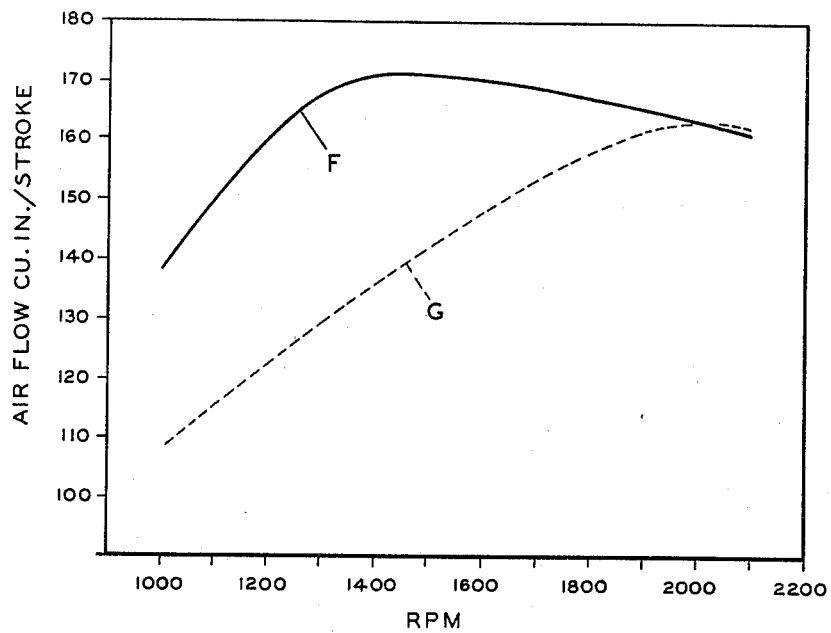
FIGURE 9 is a chart comparing the air flow of the new engine with the air flow supplied to a conventionally turbocharged engine.

Air flow supplied by the turbocharger described above is illustrated in curve F in FIGURE 9 in which maximum flow occurs at about 1400 r.p.m. with decreasing flow at lower and higher r.p.ms.

Curve G (FIGURE 9) illustrates the air flow with a conventionally turbocharged engine again showing a difference between the air flows of the new engine and a conventionally turbocharged engine in the lower speed ranges of approximately 30% and illustrating the close matching of the air flow to the fuel flow in the new engine.

Other performance characteristics are illustrated in FIGURES 10A, 10B, 10C, 10D and 10E. Here again, the air flow and fuel flow are relatively high in the low speed range as shown by curves I and H in FIGURES 10E and 10D, and the air-fuel ratio as shown by curve J in FIGURE 10C is normal for exhaust smoke control with a minimum of 19:1 at 1000 r.p.m. and a maximum of 28:1 at the higher speeds. Curve K in FIGURE 10A shows that exhaust temperatures are at a maximum of 1300° F. at 1000 r.p.m. with a minimum of slightly over 1100° F. at 1800 r.p.m. In the operating ranges of 1400 and higher, cooling of the pistons with oil jets is desirable, as illustrate din FIGURE 5 of the drawings.

FIGURE 10B illustrates in curve L that the engine has excellent thermal efficiency with a peak of about 41% at 1400 r.p.m. and minimums of about 39% at 1000 r.p.m. and about 37% at 2100 r.p.m.

Figure 12:
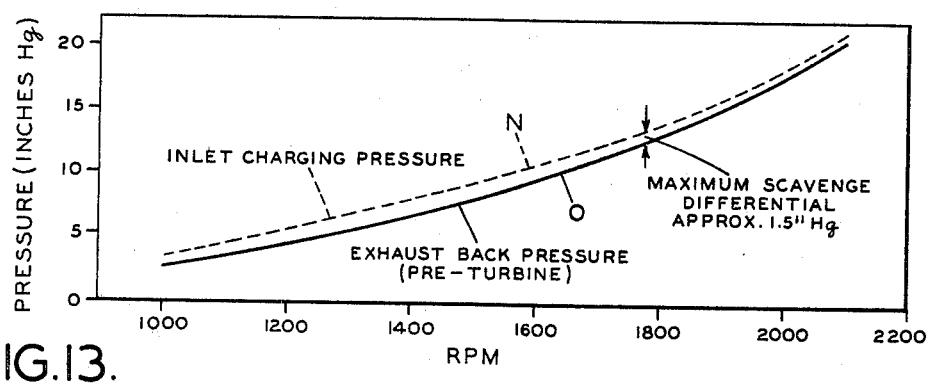
FIGURE 12 is a chart showing the scavenging effect of a conventional turbocharger on a conventionally turbocharged engine.
Figure 13:
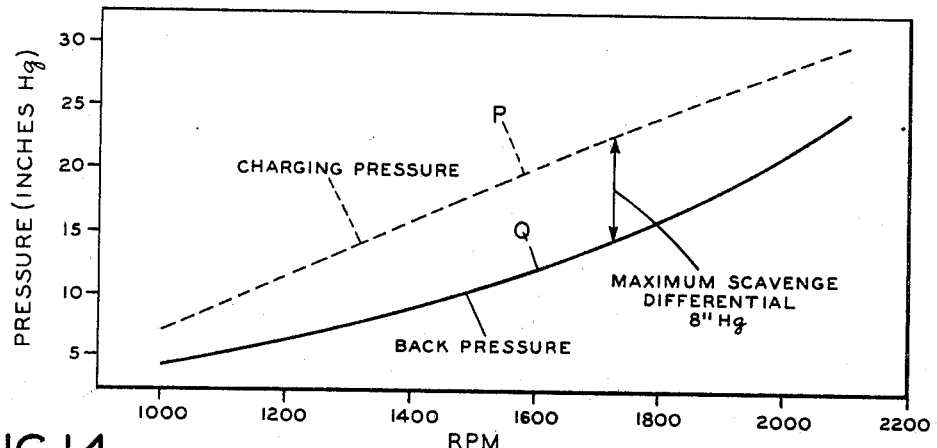
FIGURE 13 is a chart showing the scavenging effect of a divided volute turbocharger on a conventionally turbocharged engine.

Of particular importance in the matching of the turbocharger to the engine is the scavenging effect produced by the turbocharger and the fuel control system in the new engine. By way of comparison, FIGURE 12 illustrates the inlet charging pressure curve N and the exhaust back pressure curve O in a 211 horsepower engine having a turbocharger including an undivided volute turbine. The maximum scavenging differential is approximately 1.5 inches of mercury so that very little scavenging effect is obtained. These were the best conditions obtainable with the turbochargers available about ten years ago. A more modern 250 horsepower engine provided with a turbocharger of the type shown in FIGURES 2 and 3 and including a vaned diffuser in the compressor but not utilizing the fuel control scavenging pressure as illustrated in FIGURE 13 in which curve P is the charging pressure and curve Q is the back pressure. Thus, a maximum scavenging of above 8 inches of mercury occurs at about 1700 r.p.m. and a scavenging differential of 6 to 8" Hg occurs throughout the operating speed range with the result that the turbine speed is greatly increased and over-speeding can occur at high altitudes and at higher engine speeds.

Figure 14:
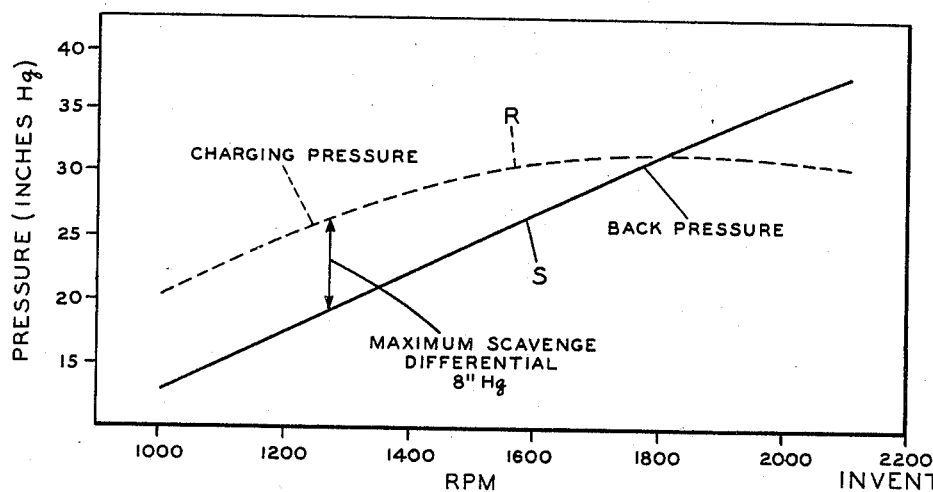
FIGURE 14 is a chart showing the scavenging effect of the fuel control system and turbocharger on the engine embodying the present invention.

As illustrated in FIGURE 14, and in accordance with the present invention, the charging pressure curve R and the back pressure curve S have a maximum scavenging differential of about 8 inches of mercury in the low speed range, that is, between about 1000 and 1400 r.p.m., which decreases to provide a negative scavenging pressure in the range between about 1800 and 2100 r.p.m. The decreased or negative scavenging pressure acts somewhat in the manner of a waste gate in reducing the speed of the turbocharger.

The performance improvements of the order described above are accompanied by rather marked increases in peak cylinder firing pressures. In a naturally aspirated engine of the same displacement, the peak firing pressure is approximately 1200 pounds per square inch, while in a conventional type of turbocharged engine, the cylinder pressure is increased to about 1500 pounds per square inch at 2100 r.p.m. As compared with the above, the new engine, because of its torque characteristics, has a maximum firing pressure of approximately 1900 pounds per square inch in the peak torque range which diminishes with increased speed to approximately 1580 pounds per square inch.

Figure 15:
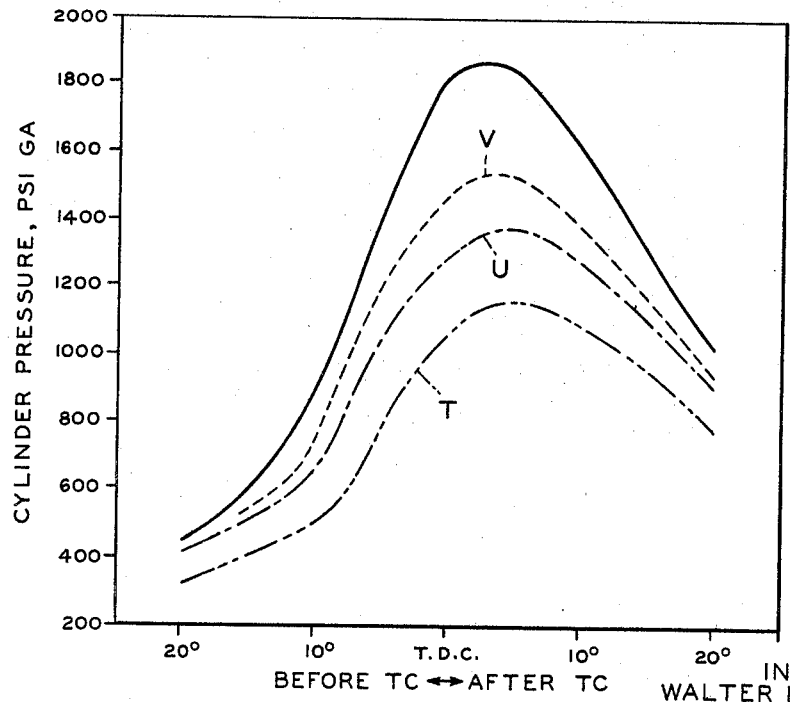
FIGURE 15 is a chart showing pressure diagrams of several different types of engines including the engine embodying the present invention.

Another difference between the new engine and prior engines is illustrated by the curves in FIGURE 15 disclosing the pressure time diagrams of four different types of engines at 1200 r.p.m. In a natural aspirated engine at 176 horsepower output the curve T shows that the maximum rate of pressure rise is on the order of approximately 100 pounds per square inch per degree and occurs at about 7° before top center. When this engine was turbocharged in the conventional manner, the compression ratio was reduced from 15.8 to 14.8 and in spite of the added charging pressure and the higher peak cylinder firing pressures, the rate of pressure rise was lower as shown in curve U, being 84 pounds per square inch per degree for a lower output turbocharged engine. In a higher horsepower engine, i.e., a 250 horsepower engine, the curve V shows that the rate of pressure rise was approximately 92 pounds per square inch per degree. The engine, in accordance with the present invention, even at the very high output at 1200 r.p.m., only has 100 pounds per square inch per degree rate of rise in the range of 5 to 10° before top center. Other interesting aspects of these curves are the fact that the actual point of peak cylinder firing pressure occurs closer to top dead center as the output is increased and the rate of pressure rise on the engine disclosed herein is no greater than the rate of pressure rise on a low-output naturally aspirated engine.

The increased loading applied by the peak cylinder firing pressure in the new engine requires some engine modifications. Thus, the area of the connecting rod bearings, as well as the crankshaft bearings and the supporting webs therefor, should be increased, and in order to avoid mushrooming of the valves under the high peak cylinder pressures, the valves can be appropriately reinforced.

From the foregoing, it will be clear that the new engine has the fuel and air supply balanced by the new fuel control system and the turbocharger so that a high power output is developed throughout the entire operating engine speed range, with due regard to smoke control, and high thermal efficiency as well as improved fuel economy are obtained.

With this engine, a relatively simple transmission can be provided having five forward speeds to give complete control and utilization of power throughout the entire operating range of the engine and under various conditions of load and terrain. The ratios in the transmission are approximately equally spaced in view of the performance characteristics of the engine and shifts need not be made until the engine speed drops to about 1240 r.p.m. instead of the more usual 1800 r.p.m. with conventionally turbocharged engines. In other words, the new engine with a five speed forward transmission provides vehicle performance, under the same conditions, equal to that of a fifteen speed transmission with a conventionally turbocharged engine.

We claim:

1. A turbocharged internal combustion engine having a substantially uniform horsepower output over a range of useful operating speeds comprising an internal combustion engine having a plurality of cylinders and pistons reciprocable therein, fuel-injecting means for supplying fuel to said engine for combustion therein, operator-controlled means for regulating the supply of fuel to said engine, engine-speed controlled means for regulating the maximum fuel charge supplied to said engine, means in said engine-speed controlled means for progressively increasing the maximum fuel charge supplied to said engine as the engine speed decreases throughout the range of useful operating speeds and decreasing the fuel supply in the idling speed range of said engine, a plurality of exhaust manifolds for said engine, said exhaust manifolds receiving exhaust gases from different engine cylinders, a turbocharger having a turbine and a blower, said blower supplying air to said cylinders for supporting combustion of fuel in said cylinders, said turbine having a rotor in including vanes providing spaces therebetween and separate gas passages connected to each manifold for separately conducting and directing exhaust gases against said vanes and into the spaces therebetween, said engine-speed controlled means and said turbocharger supplying fuel and air to said engine in proportion to produce a negative scavenging pressure in the higher useful operating speeds of said engine and an increasing positive scavenging pressure as the engine speed decreases below said higher speeds thereby matching the increasing fuel charge with decreasing engine speed to provide a substantially constant horsepower output throughout said range of useful operating speeds.

2. The engine set forth in claim 1 in which said exhaust gases and scavenging pressures maintain the rotary speed of said turbocharger within safe limits throughout said range of operating speeds and at all altitudes without venting said exhaust gases.

3. The engine set forth in claim 1 in which said engine has higher piston temperatures in the higher range of engine operating speeds and comprising jets for directing coolant against said pistons.

4. The engine set forth in claim 1 in which said engine-speed controlled means comprises a fuel control slide, an engine-speed governor for moving said slide, a lever movable with said slide, and a cam member having separate surfaces engaged by said lever in the useful operating speed range and the idling speed range for controlling the maximum fuel charge.

References Cited

UNITED STATES PATENTS

| 2,758,584 | 8/1956 | Hogeman | 123—140.3 |
| 2,811,826 | 11/1957 | Alcock | 60—13 |
| 3,289,661 | 12/1966 | May | 123—140 |
| 3,292,364 | 12/1966 | Cazier | 60—13 |
| 3,421,486 | 1/1969 | Parrish | 123—140 |

BENJAMIN W. WYCHE III, Primary Examiner

DOUGLAS HART, Assistant Examiner

U.S. Cl. X.R.

123—140

PO-1050
(5/69)

UNITED STATES PATENT OFFICE
CERTIFICATE OF CORRECTION

Patent No. 3,487,634        Dated January 6, 1970

Inventor(s) W. M. May et al.

It is certified that error appears in the above-identified patent and that said Letters Patent are hereby corrected as shown below:

Col. 1, line 46, "accomplished" is misspelled;

Col. 4, line 67, "379" should read -- .379 --;

Col. 4, line 72, "urbocharger" should read -- turbocharger --;

Col. 5, line 3, "145 to" should read -- 145 at --;

Col. 5, line 37, "illustrate din" should read -- illustrated in --; and

Col. 5, line 56, the following should be inserted after "control" -- governor shown in Figure 4 produces a very high positive --.

Signed and sealed this 8th day of June 1971.

(SEAL)
Attest:

EDWARD M. FLETCHER, JR.          WILLIAM E. SCHUYLER, JR.
Attesting Officer                 Commissioner of Patents